(12) United States Patent
Mauritz

(10) Patent No.: US 10,419,249 B2
(45) Date of Patent: Sep. 17, 2019

(54) SCRAMBLING FOR DOWNLINK SIGNALING IN WIRELESS COMMUNICATION NETWORK

(71) Applicant: TELEFONAKTIEBOLAGET LM ERICSSON (PUBL), Stockholm (SE)

(72) Inventor: Oskar Mauritz, Johanneshov (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 113 days.

(21) Appl. No.: 15/568,807

(22) PCT Filed: May 11, 2016

(86) PCT No.: PCT/SE2016/050422
§ 371 (c)(1),
(2) Date: Oct. 24, 2017

(87) PCT Pub. No.: WO2016/190799
PCT Pub. Date: Dec. 1, 2016

(65) Prior Publication Data
US 2018/0115443 A1    Apr. 26, 2018

Related U.S. Application Data

(60) Provisional application No. 62/165,441, filed on May 22, 2015.

(51) Int. Cl.
*H04L 25/03* (2006.01)
*H04L 1/00* (2006.01)
(Continued)

(52) U.S. Cl.
CPC ...... *H04L 25/03866* (2013.01); *H04L 1/0042* (2013.01); *H04L 5/0048* (2013.01); *H04W 72/042* (2013.01); *H04L 27/2613* (2013.01)

(58) Field of Classification Search
CPC ............ H04L 25/03866; H04L 1/0042; H04L 5/0048; H04W 72/042
See application file for complete search history.

(56) References Cited

U.S. PATENT DOCUMENTS

2009/0136034 A1* 5/2009 Gaal ................... G06F 7/584
380/268
2009/0249027 A1* 10/2009 Kim .................. H04L 25/03866
712/5
(Continued)

FOREIGN PATENT DOCUMENTS

| WO | 2010/108136 A1 | 9/2010 |
|---|---|---|
| WO | 2015/110948 A1 | 7/2015 |

OTHER PUBLICATIONS

3GPP, "3rd Generation Partnership Project; Technical Specification group Radio Access Network; Evolved Universal Terrestrial Radio Access (EUTRA); Physical channels and modulation (Release 12)", 3GPP TS 36.211 V12.4.0, (Dec. 2014), Section 6.2.1.
(Continued)

*Primary Examiner* — Gregory B Sefcheck
*Assistant Examiner* — Jael M Ulysse

(57) ABSTRACT

A radio access node selects an initialization value for a scrambling sequence to be applied to a message based on whether the message is intended for a non-standard device. The initialization value is selected from among at least a first value corresponding to a standard device type and a second value corresponding to a non-standard device type. The radio access node generates the scrambling sequence using the initialization value, scrambles the message using the scrambling sequence, and transmits the message.

11 Claims, 9 Drawing Sheets

(51) Int. Cl.
  *H04L 5/00* (2006.01)
  *H04W 72/04* (2009.01)
  *H04L 27/26* (2006.01)

(56) References Cited

U.S. PATENT DOCUMENTS

| | | | | |
|---|---|---|---|---|
| 2009/0323957 | A1* | 12/2009 | Luo | H04J 11/0069 380/270 |
| 2010/0034161 | A1* | 2/2010 | Luo | H04B 1/707 370/329 |
| 2010/0135257 | A1* | 6/2010 | Higuchi | H04J 11/0076 370/336 |
| 2010/0255852 | A1* | 10/2010 | Chen | H04W 72/082 455/450 |
| 2011/0038310 | A1* | 2/2011 | Chmiel | H04L 27/2613 370/328 |
| 2012/0177096 | A1* | 7/2012 | Yano | H04L 1/0057 375/224 |
| 2012/0250642 | A1* | 10/2012 | Qu | H04W 48/12 370/329 |
| 2012/0320838 | A1* | 12/2012 | Yang | H04L 5/0053 370/329 |
| 2014/0169324 | A1* | 6/2014 | Seo | H04L 5/001 370/329 |
| 2015/0043457 | A1* | 2/2015 | Liu | H04B 7/024 370/329 |
| 2015/0049685 | A1* | 2/2015 | Chen | H04L 5/0053 370/329 |
| 2016/0286495 | A1* | 9/2016 | Dinan | H04W 28/0221 |

OTHER PUBLICATIONS

3GPP, "3rd Generation Partnership Project; Technical Specification Group Radio Access Network, Evolved Universal Terrestrial Radio Access (E-UTRA); Multiplexing and channel coding (Release 11)", 3GPP TS 36.212 V11.0.0 (Sep. 2012), Section 5.3.3.

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.5.0 (Dec. 2013).

3GPP, "3rd Generation Partnership Project; Technical Specificaiton Group Radio Access Network; Evolved Universal Terrestrial Radio Access (E-UTRA); Medium Access Control (MAC) protocol specification (Release 12)", 3GPP TS 36.321 V12.4.0 (Dec. 2014), Section 6.2.1.

\* cited by examiner

SCRAMBLING FOR DOWNLINK SIGNALING IN WIRELESS COMMUNICATION NETWORK

CROSS-REFERENCE TO RELATED APPLICATIONS

This application claims priority to U.S. Provisional Patent Application No. 62/165,441 filed on May 22, 2015, the disclosure of which is hereby incorporated by reference in its entirety.

TECHNICAL FIELD

The disclosed subject matter relates generally to telecommunications and more particularly to scrambling for downlink signaling in wireless communication networks.

BACKGROUND

In communication networks such as those based on Long Term Evolution (LTE) as specified by the Third Generation Partnership Project (3GGP), there are certain data layer functions designed for mass communication with a large number of wireless devices, commonly referred to as "user equipments" (UEs). Some data layer functions are designed for peer-to-peer control of transport channels and for mapping between transport channels and logical channels. Examples of such functions include those used by the Radio Resource Control (RRC) protocol.

According to the Evolved Packet System (EPS) defined by the 3GPP LTE architecture, the radio access network is referred to as an Evolved Universal Terrestrial Radio Access Network (E-UTRAN). The E-UTRAN includes base stations, referred to as eNodeBs (eNBs) that provide E-UTRA user-plane and control-plane protocol terminations towards the UEs. User-plane protocol examples include Packet Data Convergence Protocol (PDCP), Radio Link Control (RLC), Medium Access Control (MAC), and Physical Layer (PHY), while control-plane protocol examples include RRC.

The eNBs are connected by an "S1" interface to a core network, which is referred to as an Evolved Packet Core (EPC). More specifically, the eNBs have S1 connections to a Mobility Management Entity (MME), through an S1-MME interface and to a Serving Gateway (S-GW), through an S1-U interface. Upon request from an MME, an eNB performs an E-RAB to radio bearer mapping and establishes a Data Radio Bearer and allocates the required resources on the air interface, referred to as the "Uu" interface. The eNB also sets up a logical channel for the UE and allocates it to a transport channel. These operations involve the MAC layer.

3GPP specifies the E-UTRAN MAC protocol as a sublayer of layer 2. Functions of the MAC sublayer are performed by MAC entities in the UE and in the E-UTRAN. For a MAC entity configured at the eNB, there is a peer MAC entity configured at the UE and vice versa.

A mapping of logical channels to transport channels at the MAC sublayer is configured by RRC signaling. There is one Logical Channel Identifier (LCD) field for each MAC service data unit (SDU) included in the corresponding MAC protocol data unit (PDU). The LCID field size is 5 bits, where the value 00000 is reserved for CCCH and the value 11111 is reserved for padding. The LCID for the Downlink Shared Channel (DL-SCH) uses the range 11010-11110 for MAC Control Elements (MAC CEs). A MAC CE is an explicit MAC in-band control message. The range 01011-11001 is reserved for future needs within the framework of the controlling standard. Similarly, the LCID for the Uplink Shared Channel (UL-SCH) uses the range 11000-11110 for explicit MAC in-band control, while the range 01100-10111 is reserved for future needs within the standard.

There is a relatively scarce range of LCID values within the predefined set(s) of LCID values. Moreover, the standard tightly controls the meaning and use of the LCID values. As a general proposition, conformance to these default meaning or mappings is required for proper operation between the network and the wireless devices. Moreover, if one wishes to deviate from or expand these default mappings, standardizing new LCIDs for MAC control or other purposes is a slow, cumbersome process.

Non-standard UEs that need to communicate their non-compatibility with the standard to a standardized mobile communications network need to send non-standard messages to the network. An example of such a non-standard message may be an identifier for a non-standard UE class needed for the network to handle the UE properly or in an optimized way.

To avoid a malfunction of the network, such messages should not be sent unless the UE knows that the network can understand the message. It is therefore necessary that the network can signal support of the non-standard UE. There may also be a need for the network to provide other non-standard messages to a non-standard UE.

In E-UTRA both the S1 and the X2 interfaces allow for the inclusion of proprietary messages. However, the protocols for RRC, MAC, and physical layer protocols do not support proprietary messages. One way to provide non-standard messages in RRC or MAC is to use reserved bits or bit sequences. An alternative is to apply alternate use of a standardized Logical Channel Identity (LCID) in a MAC subheader.

SUMMARY

In certain embodiments, a method of operating a radio access node comprises selecting an initialization value for a scrambling sequence to be applied to a message based on whether the message is intended for a non-standard device, wherein the initialization value is selected from among at least a first value corresponding to a standard device type and a second value corresponding to a non-standard device type, generating the scrambling sequence using the initialization value, scrambling the message using the scrambling sequence, and transmitting the message.

In certain related embodiments, the first value is defined according to a radio network temporary identifier (RNTI) used to scramble a cyclic redundancy check (CRC) of a physical downlink control channel (PDCCH) message transmitted previously by the radio access node, and the second value is not defined according to the RNTI. The message may be, for instance, a physical downlink shared channel (PDSCH) message having a format indicated by the PDCCH message.

In certain related embodiments, the first value is defined as $c_{init}$ according to an equation $c_{init}=n_{RNTI} \cdot 2^{14}+q \cdot 2^{13}+\lfloor n_s/2 \rfloor \cdot 2^9+N_{ID}^{cell}$, where $n_{RNTI}$ is equal to a value of an RNTI used to scramble a CRC in a PDCCH message transmitted previously by the radio access node, q denotes a codeword, $n_s$ denotes a slot number within a radio frame, and $N_{ID}^{cell}$ denotes a physical layer cell identity of the radio access node, and wherein the second value is defined as $c_{init}$ according to the equation $c_{init}=X \cdot 2^{14}+q \cdot 2^{13}+\lfloor n_s/2 \rfloor \cdot 2^9+N_{ID}^{cell}$, where X is not equal to the value of the RNTI. X may denote, for instance, a pre-defined value that is independent of $n_{RNTI}$, or a value that is related to but different from $n_{RNTI}$.

In certain related embodiments, the first value is defined as $c_{init}$ according to an equation $c_{init}=n_{RNTI}\cdot 2^{14}+q\cdot 2^{13}+\lfloor n_s/2\rfloor\cdot 2^9+N_{ID}^{cell}$, where $n_{RNTI}$ is equal to a value of an RNTI used to scramble a CRC in a PDCCH message transmitted previously by the radio access node, q denotes a codeword, $n_s$ denotes a slot number within a radio frame, and $N_{ID}^{cell}$ denotes a physical layer cell identity of the radio access node, and wherein the second value is a permutation of a binary representation of $c_{init}$.

In some embodiments, a method of operating a wireless communication device belonging to a non-standard UE class comprises receiving a first message via a first communication channel, wherein the first message is scrambled, at least in part, according to an RNTI associated with a standard UE class, and the first message comprises control information specifying a format of a second message, descrambling the first message according to the first scrambling sequence, receiving the second message via a second communication channel, wherein the second message is scrambled according to a second scrambling sequence generated with an initialization value $c_{init}$ defined according to the equation $c_{init}=X\cdot 2^{14}+q\cdot 2^{13}+\lfloor n_s/2\rfloor\cdot 2^9+N_{ID}^{cell}$, where q denotes a codeword, $n_s$ denotes a slot number within a radio frame, $N_{ID}^{cell}$ denotes a physical layer cell identity of the radio access node, and X denotes a value that is different from a value of the RNTI, and wherein the second message comprises data, and descrambling the second message according to the second scrambling sequence.

In certain related embodiments, the method further comprises determining that the second message is intended for the wireless communication device, based on a determination that the wireless communication device is capable of descrambling the second message according to the second scrambling sequence.

In certain related embodiments, the method further comprises receiving a third message via the second communication channel, wherein the third message is scrambled according to a third scrambling sequence generated with an initialization value defined according to the RNTI, and the third message comprises data, and attempting to descramble the third message according to the second scrambling sequence.

In certain related embodiments, the first message comprises a cyclic redundancy check that is scrambled by the RNTI and a codeword that is scrambled independent of the RNTI.

In certain related embodiments, the first channel is a PDCCH and the second channel is a PDSCH.

In certain related embodiments, X is defined independent of RNTI.

In some embodiments, a method of operating a radio access node comprises selectively scrambling a message using a first scrambling sequence or a second scrambling sequence based on whether the message is intended for a non-standard device, wherein the first scrambling sequence is generated with a first initialization value corresponding to a first UE class, and the second scrambling sequence is generated with a second initialization value corresponding to a second UE class, and transmitting the message.

In certain related embodiments, the first UE class is a standard UE class and the second UE class is a non-standard UE class.

In certain related embodiments, the first initialization value is defined according to an RNTI used to scramble a CRC of a PDCCH message transmitted previously by the radio access node, and the second value is not defined according to the RNTI.

In certain related embodiments, the message is a PDSCH message having a format indicated by the PDCCH message.

In certain related embodiments, the first initialization value is defined as $c_{init}$ according to an equation $c_{init}=n_{RNTI}\cdot 2^{14}+q\cdot 2^{13}+\lfloor n_s/2\rfloor\cdot 2^9+N_{ID}^{cell}$, where $n_{RNTI}$ is equal to a value of an RNTI used to scramble a CRC in a PDCCH message transmitted previously by the radio access node, q denotes a codeword, $n_s$ denotes a slot number within a radio frame, and $N_{ID}^{cell}$ denotes a physical layer cell identity of the radio access node, and wherein the second initialization value is defined as $c_{init}$ according to the equation $c_{init}=X\cdot 2^{14}+q\cdot 2^{13}+\lfloor n_s/2\rfloor\cdot 2^9+N_{ID}^{cell}$, where X is not equal to the value of the RNTI.

In some embodiments, a radio access node comprises one or more processors configured to select an initialization value for a scrambling sequence to be applied to a message based on whether the message is intended for a non-standard device, wherein the initialization value is selected from among at least a first value corresponding to a standard device type and a second value corresponding to a non-standard device type, generate the scrambling sequence using the initialization value, and scramble the message using the scrambling sequence. The radio access node further comprises a transmitter configured to transmit the message.

In certain related embodiments, the first value is defined according to an RNTI used to scramble a CRC of a PDCCH message transmitted previously by the radio access node, and the second value is not defined according to the RNTI.

In certain related embodiments, the message is a PDSCH message having a format indicated by the PDCCH message.

In certain related embodiments, the first value is defined as $c_{init}$ according to an equation $c_{init}=n_{RNTI}\cdot 2^{14}+q\cdot 2^{13}+\lfloor n_s/2\rfloor\cdot 2^9+N_{ID}^{cell}$, where $n_{RNTI}$ is equal to a value of an RNTI used to scramble a CRC in a PDCCH message transmitted previously by the radio access node, q denotes a codeword, $n_s$ denotes a slot number within a radio frame, and $N_{ID}^{cell}$ denotes a physical layer cell identity of the radio access node, and wherein the second value is defined as $c_{init}$ according to the equation $c_{init}=X\cdot 2^{14}+q\cdot 2^{13}+\lfloor n_s/2\rfloor\cdot 2^9+N_{ID}^{cell}$, where X is not equal to the value of the RNTI. X may denote, for instance, a pre-defined value that is independent of $n_{RNTI}$, or a value that is related to but different from $n_{RNTI}$.

In certain related embodiments, the first value is defined as $c_{init}$ according to an equation $c_{init}=n_{RNTI}\cdot 2^{14}+q\cdot 2^{13}+\lfloor n_s/2\rfloor\cdot 2^9+N_{ID}^{cell}$, where $n_{RNTI}$ is equal to a value of an RNTI used to scramble a CRC in a PDCCH message transmitted previously by the radio access node, q denotes a codeword, $n_s$ denotes a slot number within a radio frame, and $N_{ID}^{cell}$ denotes a physical layer cell identity of the radio access node, and wherein the second value is a permutation of a binary representation of $c_{init}$.

In some embodiments, a wireless communication device belonging to a non-standard UE class comprises one or more processors configured to receive a first message via a first communication channel, wherein the first message is scrambled, at least in part, according to an RNTI associated with a standard UE class, and the first message comprises control information specifying a format of a second message, descramble the first message according to the first scrambling sequence, receive the second message via a second communication channel, wherein the second message is scrambled according to a second scrambling sequence generated with an initialization value defined independent of the RNTI, and the second message comprises data, and descramble the second message according to the second scrambling sequence.

In certain related embodiments, the one or more processors are further configured to determine that the second message is intended for the wireless communication device, based on a determination that the wireless communication device is capable of descrambling the second message according to the second scrambling sequence.

In certain related embodiments, the first message comprises a cyclic redundancy check that is scrambled by the RNTI and a codeword that is scrambled independent of the RNTI.

In certain related embodiments, the first channel is a PDCCH and the second channel is a PDSCH.

In certain related embodiments, the second initialization value is defined as $c_{init}$ according to the equation $c_{init} = X \cdot 2^{14} + q \cdot 2^{13} + \lfloor n_s/2 \rfloor \cdot 2^9 + N_{ID}^{cell}$, where X is not equal to a value of the RNTI.

In some embodiments, a radio access node comprises one or more processors configured to selectively scramble a message using a first scrambling sequence or a second scrambling sequence based on whether the message is intended for a non-standard device, wherein the first scrambling sequence is generated with a first initialization value corresponding to a first UE class, and the second scrambling sequence is generated with a second initialization value corresponding to a second UE class, and a transmitter configured to transmit the message.

In certain related embodiments, the first UE class is a standard UE class and the second UE class is a non-standard UE class.

In certain related embodiments, the first initialization value is defined according to an RNTI used to scramble a CRC of a PDCCH message transmitted previously by the radio access node, and the second value is not defined according to the RNTI.

In certain related embodiments, the message is a PDSCH message having a format indicated by the PDCCH message.

In certain related embodiments, the first initialization value is defined as $c_{init}$ according to an equation $c_{init} = n_{RNTI} \cdot 2^{14} + q \cdot 2^{13} + \lfloor n_s/2 \rfloor \cdot 2^9 + N_{ID}^{cell}$, where $n_{RNTI}$ is equal to a value of an RNTI used to scramble a CRC in a PDCCH message transmitted previously by the radio access node, q denotes a codeword, $n_s$ denotes a slot number within a radio frame, and $N_{ID}^{cell}$ denotes a physical layer cell identity of the radio access node, and wherein the second initialization value is defined as $c_{init}$ according to the equation $c_{init} = X \cdot 2^{14} + q \cdot 2^{13} + \lfloor n_s/2 \rfloor \cdot 2^9 + N_{ID}^{cell}$, where X is not equal to the value of the RNTI.

In some embodiments, a radio access node comprises one or more processors configured to select an initialization value for a scrambling sequence to be applied to a message based on whether the message is intended for a non-standard device, wherein the initialization value is selected from among at least a first value corresponding to a standard device type and a second value corresponding to a non-standard device type, generate the scrambling sequence using the initialization value, and scramble the message using the scrambling sequence, and a transmitter configured to transmit the message.

In certain related embodiments, the first value is defined according to an RNTI used to scramble a CRC of a PDCCH message transmitted previously by the radio access node, and the second value is not defined according to the RNTI.

In certain related embodiments, the message is a PDSCH message having a format indicated by the PDCCH message.

In certain related embodiments, the first value is defined as $c_{init}$ according to an equation $c_{init} = n_{RNTI} \cdot 2^{14} + q \cdot 2^{13} + \lfloor n_s/2 \rfloor \cdot 2^9 + N_{ID}^{cell}$, where $n_{RNTI}$ is equal to a value of an RNTI used to scramble a CRC in a PDCCH message transmitted previously by the radio access node, q denotes a codeword, $n_s$ denotes a slot number within a radio frame, and $N_{ID}^{cell}$ denotes a physical layer cell identity of the radio access node, and wherein the second value is defined as $c_{init}$ according to the equation $c_{init} = X \cdot 2^{14} + q \cdot 2^{13} + \lfloor n_s/2 \rfloor \cdot 2^9 + N_{ID}^{cell}$, where X is not equal to the value of the RNTI. X may denote, for instance, a pre-defined value that is independent of $n_{RNTI}$, or a value that is related to but different from $n_{RNTI}$.

In certain related embodiments, the first value is defined as $c_{init}$ according to an equation $c_{init} = n_{RNTI} \cdot 2^{14} + q \cdot 2^{13} + \lfloor n_s/2 \rfloor \cdot 2^9 + N_{ID}^{cell}$, where $n_{RNTI}$ is equal to a value of an RNTI used to scramble a CRC in a PDCCH message transmitted previously by the radio access node, q denotes a codeword, $n_s$ denotes a slot number within a radio frame, and $N_{ID}^{cell}$ denotes a physical layer cell identity of the radio access node, and wherein the second value is a permutation of a binary representation of $c_{init}$.

In certain related embodiments, a wireless communication device belonging to a non-standard UE class comprises one or more processors configured to receive a first message via a first communication channel, wherein the first message is scrambled, at least in part, according to an RNTI associated with a standard UE class, and the first message comprises control information specifying a format of a second message, descramble the first message according to the first scrambling sequence, receive the second message via a second communication channel, wherein the second message is scrambled according to a second scrambling sequence generated with an initialization value defined independent of the RNTI, and the second message comprises data, and descramble the second message according to the second scrambling sequence.

In certain related embodiments, the one or more processors are further configured to determine that the second message is intended for the wireless communication device, based on a determination that the wireless communication device is capable of descrambling the second message according to the second scrambling sequence.

In certain related embodiments, the first message comprises a cyclic redundancy check that is scrambled by the RNTI and a codeword that is scrambled independent of the RNTI.

In certain related embodiments, the first channel is a PDCCH and the second channel is a PDSCH.

In certain related embodiments, the second initialization value is defined as $c_{init}$ according to the equation $c_{init} = X \cdot 2^{14} + q \cdot 2^{13} + \lfloor n_s/2 \rfloor \cdot 2^9 + N_{ID}^{cell}$, where X is not equal to a value of the RNTI.

In certain related embodiments, a radio access node comprises one or more processors configured to selectively scramble a message using a first scrambling sequence or a second scrambling sequence based on whether the message is intended for a non-standard device, wherein the first scrambling sequence is generated with a first initialization value corresponding to a first UE class, and the second scrambling sequence is generated with a second initialization value corresponding to a second UE class, and a transmitter configured to transmit the message.

In certain related embodiments, the first UE class is a standard UE class and the second UE class is a non-standard UE class.

In certain related embodiments, the first initialization value is defined according to an RNTI used to scramble a CRC of a PDCCH message transmitted previously by the radio access node, and the second value is not defined according to the RNTI.

In certain related embodiments, the message is a PDSCH message having a format indicated by the PDCCH message.

In certain related embodiments, the first initialization value is defined as $c_{init}$ according to an equation $c_{init} = n_{RNTI} \cdot 2^{14} + q \cdot 2^{13} + \lfloor n_s/2 \rfloor \cdot 2^9 + N_{ID}^{cell}$, where $n_{RNTI}$ is equal to a value of an RNTI used to scramble a CRC in a PDCCH message transmitted previously by the radio access node, q denotes a codeword, $n_s$ denotes a slot number within a radio frame, and $N_{ID}^{cell}$ denotes a physical layer cell identity of the radio access node, and wherein the second initialization value is defined as $c_{init}$ according to the equation $c_{init} = X \cdot 2^{14} + q \cdot 2^{13} + \lfloor n_s/2 \rfloor \cdot 2^9 + N_{ID}^{cell}$, where X is not equal to the value of the RNTI.

BRIEF DESCRIPTION OF THE DRAWINGS

The drawings illustrate selected embodiments of the disclosed subject matter. In the drawings, like reference labels denote like features.

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

At least some of the described embodiments are presented in recognition of shortcomings of conventional approaches. Examples of such shortcomings include the following.

For UEs to be used temporarily, e.g. for demonstration purposes, it is possible to use reserved bits or bit strings in existing protocols, e.g. the Medium Access Control (MAC) protocol or the Radio Resource Control (RRC) protocol. However, it is generally undesirable to use reserved bits or bit strings for non standard-compliant UEs that appear in mobile communications networks for a longer time and that are not supported by all networks. One reason for this undesirability is that the reserved bits or bit strings may be used in later releases of the standard. For example, a Category 0 UE is identified from E-UTRA Rel-12 when transmitting the LCID "01011" in Random Access Msg 3. This LCID has been reserved in earlier releases of E-UTRA. Similarly, the LCID was reserved before Release-12 of the standard when it was assigned the value "Dual Connectivity Power Headroom Report". A Category 0 UE may be half-duplex Frequency Division Duplex, FDD, Type B as defined by 3GPP TS 36.306, for example.

In certain embodiments described below, a downlink message to a non-standard UE is scrambled with a scrambling sequence initialized with a non-standard value. A potential benefit of such embodiments is that they may allow messages to be sent to non-standard UEs without using reserved bits or bit strings in standard protocols, and without substantially impacting other aspects of eNB implementation.

The described embodiments may be implemented in any appropriate type of communication system supporting any suitable communication standards and using any suitable components. As one example, certain embodiments may be implemented in an LTE network such as that illustrated in FIG. 1.

Figure 1:
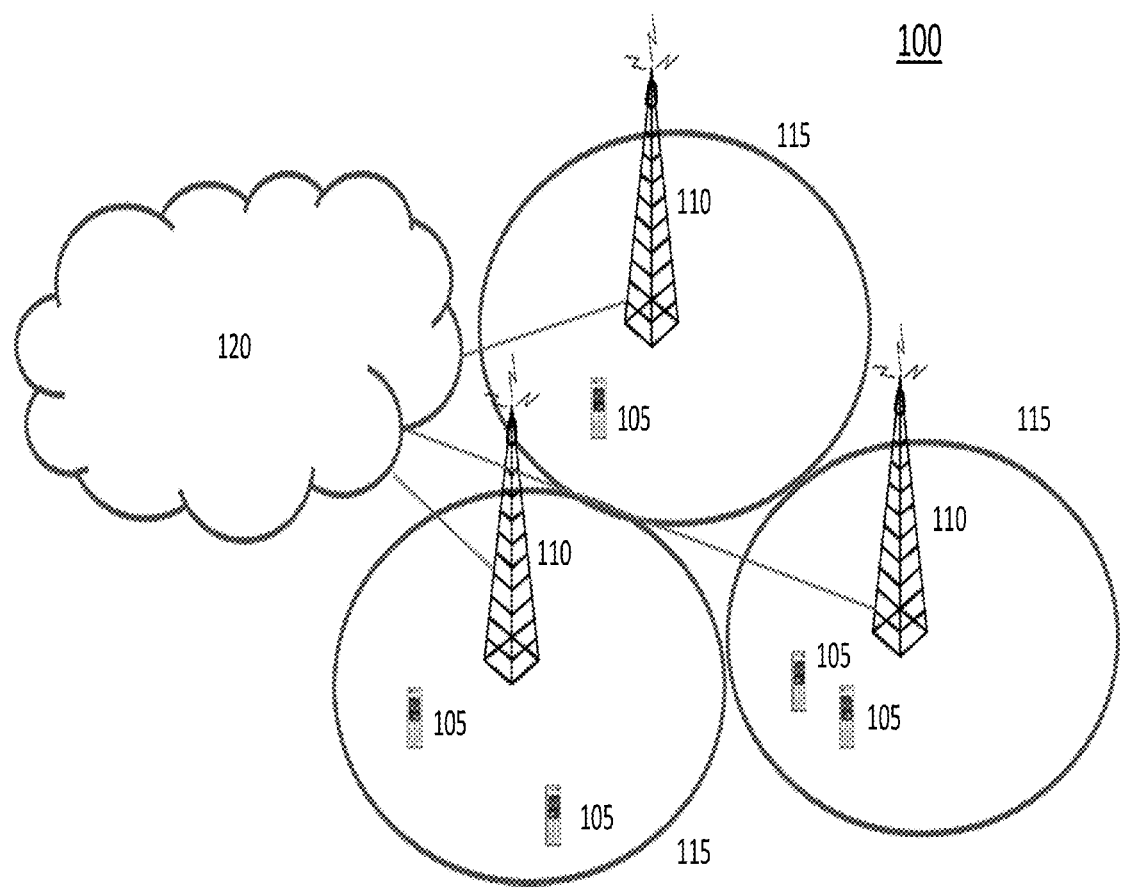
FIG. 1 illustrates an example LTE network.

Referring to FIG. 1, a communication network 100 comprises a plurality of wireless communication devices 105 (e.g., conventional UEs, machine type communication [MTC]/machine-to-machine [M2M] UEs) and a plurality of radio access nodes 110 (e.g., eNodeBs or other base stations). Communication network 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone).

Figure 2:
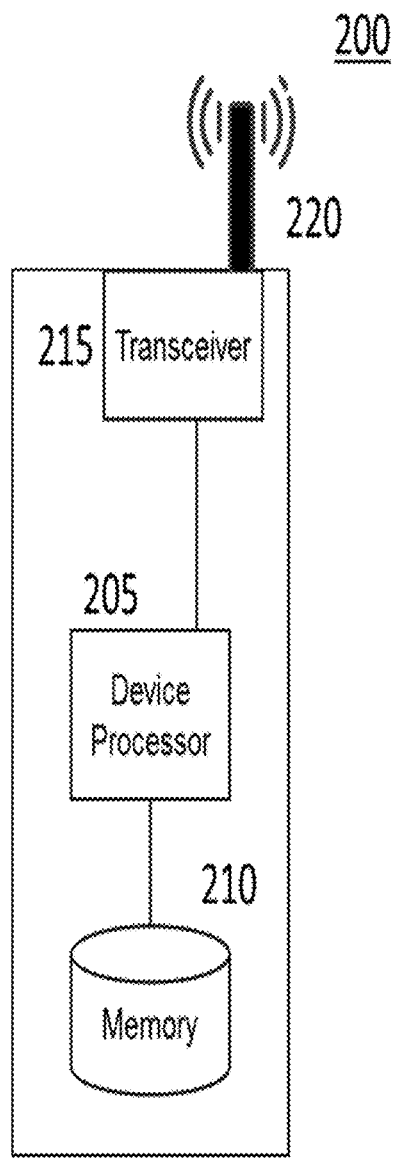
FIG. 2 illustrates an example wireless communication device.

Although wireless communication devices 105 may represent communication devices that include any suitable combination of hardware and/or software, these wireless communication devices may, in certain embodiments, represent devices such as an example wireless communication device illustrated in greater detail by FIG. 2. Similarly, although the illustrated radio access node may represent network nodes that include any suitable combination of hardware and/or software, these nodes may, in particular embodiments, represent devices such as the example radio access node illustrated in greater detail by FIG. 3.

Referring to FIG. 2, a wireless communication device 200 comprises a processor 205, a memory, a transceiver 215, and an antenna 220. In certain embodiments, some or all of the functionality described as being provided by UEs, MTC or M2M devices, and/or any other types of wireless communication devices may be provided by a device processor executing instructions stored on a computer-readable medium, such as the memory shown in FIG. 2. Alternative embodiments may include additional components beyond those shown in FIG. 2 that may be responsible for providing certain aspects of the device's functionality, including any of the functionality described herein.

Figure 3:
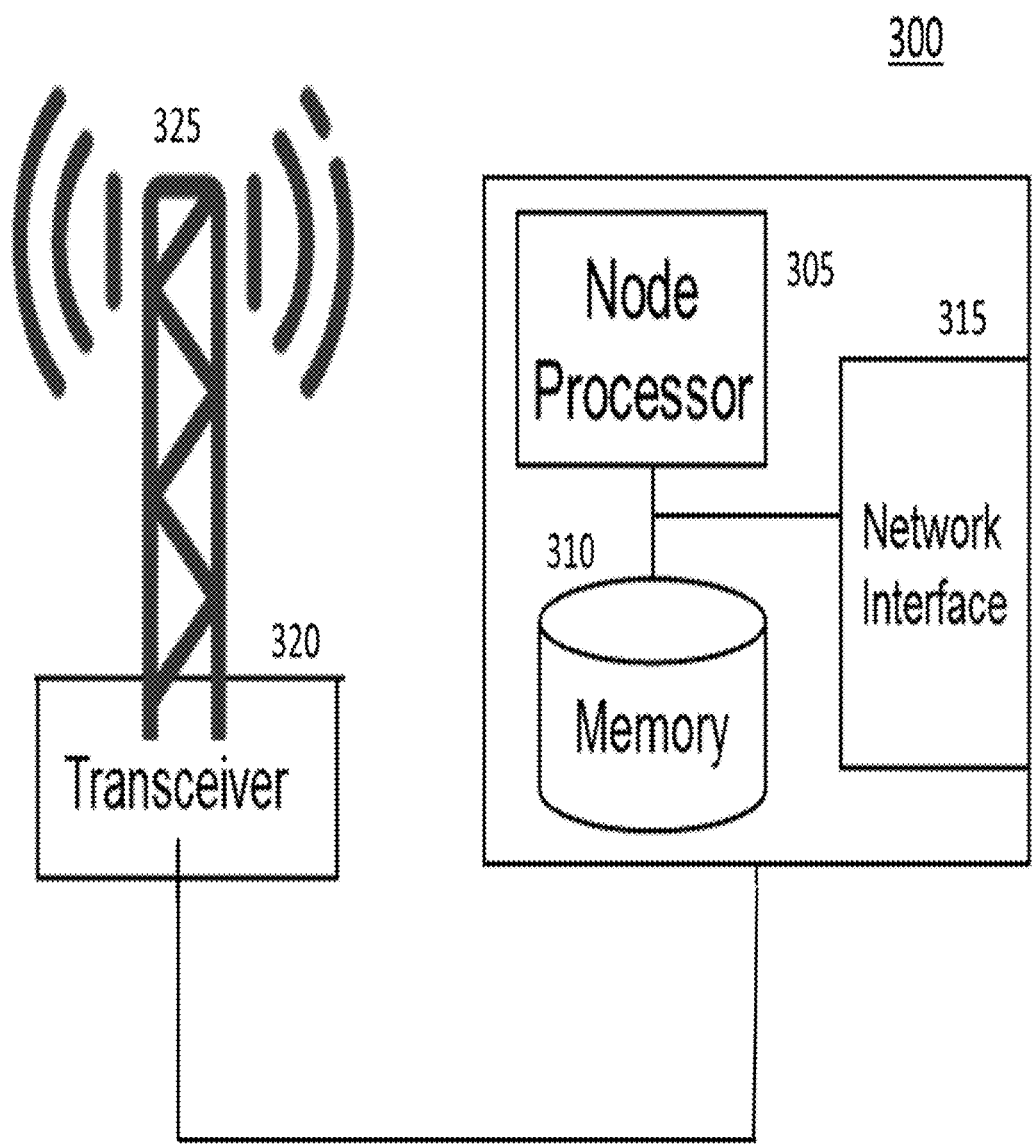
FIG. 3 illustrates an example radio access node.

Referring to FIG. 3, a radio access node 300 comprises a node processor 305, a memory 310, a network interface 315, a transceiver 320, and an antenna 325. In certain embodiments, some or all of the functionality described as being provided by a base station, a node B, an eNB, and/or any other type of network node may be provided by node processor 305 executing instructions stored on a computer-readable medium, such as memory 310 shown in FIG. 3. Alternative embodiments of radio access node 300 may comprise additional components to provide additional functionality, such as the functionality described herein and/or related supporting functionality.

In E-UTRA, scrambling is applied for most physical channels. A pseudo-random binary scrambling sequence of ones and zeroes is generated from a set of shift registers and typically depends on an initial state of the shift registers. A sequence of channel coded bits to be transmitted to UE(s) is then scrambled according to the scrambling sequence, i.e. if bit i of the scrambling sequence is 1, then bit i of the channel coded bit sequence is altered from 0 to 1 or from 1 to 0, otherwise bit i of the channel coded bit sequence is left unaltered. A UE receiving data must perform the inverse operation of scrambling, i.e. descrambling, to successfully decode the data.

A downlink data transmission on physical downlink shared channel (PDSCH) is preceded by transmission on a PDCCH to an intended UE or intended UEs. The PDCCH transmission specifies a format of the PDSCH transmission through a channel coded message.

The PDCCH transmission comprises a channel coded message and a Cyclic Redundancy Check (CRC). The CRC is added to the channel coded message and the CRC bits are then scrambled according to a Radio Network Temporary Identifier (RNTI). Thereafter, the whole PDCCH message, including the scrambled CRC, is scrambled by a scrambling sequence initialized by $c_{init}$ defined by the following equation (1), which does not depend on any RNTI and where $n_s$ denotes a slot number within a radio frame, and $N_{ID}^{cell}$ denotes a physical cell layer identity.

$$c_{init} = \lfloor n_s/2 \rfloor 2^9 + N_{ID}^{cell} \quad (1)$$

Each UE decodes different formats of PDCCH and checks if the CRC bits are scrambled by any of a set of RNTIs it is supposed to monitor. After successful decoding of the PDCCH transmission with an appropriate RNTI, the UE receives the PDSCH transmission according to information provided by the PDCCH message, including the format as indicated above.

The PDSCH transmission comprises a PDSCH message that has been scrambled by a scrambling sequence initialized with $c_{init}$ defined by the following equation (2), where $n_{RNTI}$ has the same value as RNTI used to scramble the CRC in the PDCCH message, q is a codeword, $n_s$ denotes a slot number within a radio frame, and $N_{ID}^{cell}$ denotes the physical layer cell identity.

$$c_{init} = n_{RNTI} \cdot 2^{14} + q \cdot 2^{13} + \lfloor n_s/2 \rfloor \cdot 2^9 + N_{ID}^{cell} \quad (2)$$

As an alternative to using equation (2) with $n_{RNTI}$ having the same value as RNTI, certain embodiments use a different value for $n_{RNTI}$ when scrambling a PDSCH message to be transmitted to a non-standard UE. For instance, equation (2) may be replaced by the following equation (3), in which X denotes a value other than the RNTI used to scramble the PDCCH message.

$$c_{init} = X \cdot 2^{14} + q \cdot 2^{13} + \lfloor n_s/2 \rfloor \cdot 2^9 + N_{ID}^{cell} \quad (3)$$

Stated another way, when communicating with a non-standard UE, a radio access node may use the RNTI value for PDCCH scrambling as described above, and then use a value other than RNTI for PDSCH scrambling according to equation (2). In contrast, when communicating with a standard UE, the radio access node may use the RNTI value for PDCCH scrambling as described above, and then use the same RNTI for PDSCH scrambling according to equation (2). Then, the non-standard UE and the standard UE may perform descrambling operations according to the respective scrambling approaches used by the radio access node.

Consequently, a non-standard UE may be able to successfully descramble a PDCCH message according to the RNTI, but unable to descramble a corresponding PDSCH message intended for a standard UE. Likewise, a standard UE may be able to successfully descramble a PDCCH message according to the RNTI, but unable to descramble a corresponding PDSCH message intended for a non-standard UE.

By the above techniques, a non-standard UE can decode a PDSCH message from an eNB, recognizing that the message is intended for that specific UE or for any category to which it may belong. An eNB that does not support the non-standard UE class may use the same RNTI for PDCCH as that for the non-standard UE but will scramble PDSCH according to the standard. The non-standard UE will then not be able to decode PDSCH. A potential benefit of the described embodiments is that an eNB not supporting the non-standard UE class does not need to reserve any RNTI for the non-standard UE class.

In some embodiments, the eNB sends system information for the non-standard class of UEs with a given RNTI for PDCCH and sends related data on PDSCH using a non-standard value for initializing the scrambling sequence.

Non-limiting examples of non-standard changes to $c_{init}$ include the following.

Replacing $n_{RNTI}$ with a pre-defined value;

Replacing $n_{RNTI}$ with a value related to but different from $n_{RNTI}$

Permuting the bits in the binary representation of $c_{init}$

Figure 4:
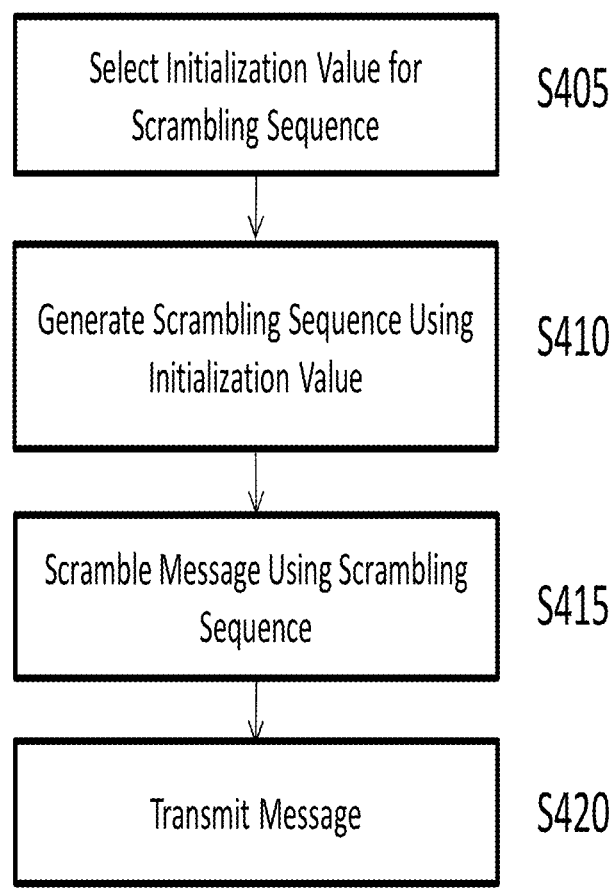
FIG. 4 illustrates a method of operating a radio access node according to an example embodiment.

FIG. 4 illustrates a method 400 of operating a radio access node according to an example embodiment. The method of FIG. 4 may be performed by a radio access node such as that illustrated in FIG. 3 or 7, for instance.

Referring to FIG. 4, the method comprises selecting an initialization value for a scrambling sequence to be applied to a message based on whether the message is intended for a non-standard device, wherein the initialization value is selected from among at least a first value corresponding to a standard device type and a second value corresponding to a non-standard device type (S405), generating the scrambling sequence using the initialization value (S410), scrambling the message using the scrambling sequence (S415), and transmitting the message (S420).

In certain embodiments, the first value is defined according to an RNTI used to scramble a CRC of a PDCCH message transmitted previously by the radio access node, and the second value is not defined according to the RNTI. Moreover, in certain embodiments the message is a PDSCH message having a format indicated by the PDCCH message.

In certain embodiments, the first value is defined as $c_{init}$ according to an equation $c_{init} = n_{RNTI} \cdot 2^{14} + q \cdot 2^{13} + \lfloor n_s/2 \rfloor \cdot 2^9 + N_{ID}^{cell}$, where $n_{RNTI}$ is equal to a value of an RNTI used to scramble a CRC in a PDCCH message transmitted previously by the radio access node, q denotes a codeword, $n_s$ denotes a slot number within a radio frame, and $N_{ID}^{cell}$ denotes a physical layer cell identity of the radio access node, and wherein the second value is defined as $c_{init}$ according to the equation $c_{init} = X \cdot 2^{14} + q \cdot 2^{13} + \lfloor n_s/2 \rfloor \cdot 2^9 + N_{ID}^{cell}$, where X is not equal to the value of the RNTI. In various alternative embodiments, X may denote a pre-defined value that is independent of $n_{RNTI}$, or a value that is related to but different from $n_{RNTI}$. For instance, X may be derived from $n_{RNTI}$ either directly or indirectly.

In certain embodiments, the first value is defined as $c_{init}$ according to an equation $c_{init} = n_{RNTI} \cdot 2^{14} + q \cdot 2^{13} + \lfloor n_s/2 \rfloor \cdot 2^9 + N_{ID}^{cell}$, where $n_{RNTI}$ is equal to a value of an RNTI used to scramble a CRC in a PDCCH message transmitted previously by the radio access node, q denotes a codeword, $n_s$ denotes a slot number within a radio frame, and $N_{ID}^{cell}$ denotes a physical layer cell identity of the radio access node, and wherein the second value is a permutation of a binary representation of $c_{init}$.

Figure 5:
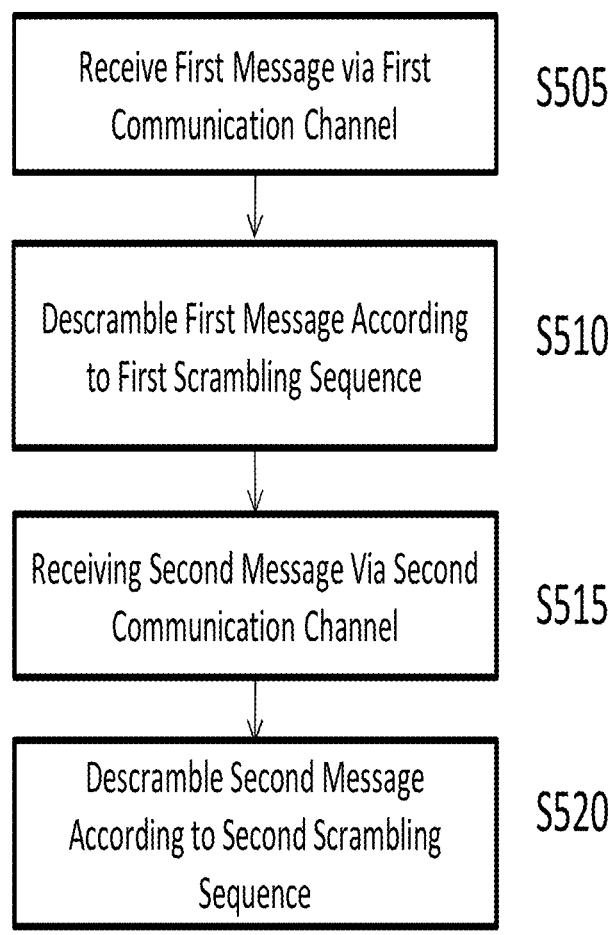
FIG. 5 illustrates a method of operating a UE according to an example embodiment.

FIG. 5 illustrates a method 500 of operating a UE according to an example embodiment. The method of FIG. 5 may be performed by a UE such as that illustrated in FIG. 2 or 8, for instance.

Referring to FIG. 5, the method comprises receiving a first message via a first communication channel, wherein the first message is scrambled, at least in part, according to an RNTI associated with a standard UE class, and the first message comprises control information specifying a format of a second message (S505), descrambling the first message according to the first scrambling sequence (S510), receiving the second message via a second communication channel, wherein the second message is scrambled according to a second scrambling sequence generated with an initialization value $c_{init}$ defined according to the equation $c_{init} = X \cdot 2^{14} + q \cdot 2^{13} + \lfloor n_s/2 \rfloor \cdot 2^9 + N_{ID}^{cell}$, where q denotes a codeword, $n_s$ denotes a slot number within a radio frame, $N_{ID}^{cell}$ denotes a physical layer cell identity of the radio access node, and X denotes a value that is different from a value of the RNTI, and wherein the second message comprises data (S515), and descrambling the second message according to the second scrambling sequence (S520).

In certain embodiments, the method further comprises determining that the second message is intended for the wireless communication device, based on a determination that the wireless communication device is capable of descrambling the second message according to the second scrambling sequence.

In certain embodiments, the method further comprises receiving a third message via the second communication channel, wherein the third message is scrambled according to a third scrambling sequence generated with an initialization value defined according to the RNTI and the third message comprises data, and attempting to descramble the third message according to the second scrambling sequence.

In certain embodiments, the first message comprises a cyclic redundancy check that is scrambled by the RNTI, and a codeword that is scrambled independent of the RNTI.

In certain embodiments, the first channel is PDCCH and the second channel is PDSCH.

In certain embodiments, X is defined independent of the RNTI.

Figure 6:
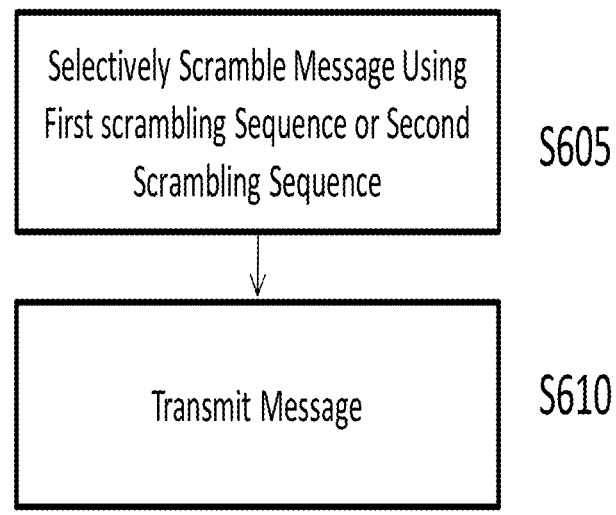
FIG. 6 illustrates a method of operating a radio access node according to another example embodiment.

FIG. 6 illustrates a method 600 of operating a radio access node according to another example embodiment. The method of FIG. 6 may be performed by a radio access node such as that illustrated in FIG. 3 or 9, for instance.

Referring to FIG. 6, the method comprises selectively scrambling a message using a first scrambling sequence or a second scrambling sequence based on whether the message is intended for a non-standard device, wherein the first scrambling sequence is generated with a first initialization value corresponding to a first UE class, and the second scrambling sequence is generated with a second initialization value corresponding to a second UE class (S605), and transmitting the message (S610).

In certain embodiments, the first UE class is a standard UE class and the second UE class is a non-standard UE class. In certain embodiments, the first initialization value is defined according to an RNTI used to scramble a CRC of a PDCCH message transmitted previously by the radio access node, and the second value is not defined according to the RNTI.

In certain embodiments, the message is a PDSCH message having a format indicated by the PDCCH message.

In certain embodiments, the first initialization value is defined as $c_{init}$ according to an equation $c_{init} = n_{RNTI} \cdot 2^{14} + q \cdot 2^{13} + \lfloor n_s/2 \rfloor \cdot 2^9 + N_{ID}^{cell}$, where $n_{RNTI}$ is equal to a value of an RNTI used to scramble a CRC in a PDCCH message transmitted previously by the radio access node, q denotes a codeword, $n_s$ denotes a slot number within a radio frame, and $N_{ID}^{cell}$ denotes a physical layer cell identity of the radio access node, and wherein the second initialization value is defined as $c_{init}$ according to the equation $c_{init} = X \cdot 2^{14} + q \cdot 2^{13} + \lfloor n_s/2 \rfloor \cdot 2^9 + N_{ID}^{cell}$, where X is not equal to the value of the RNTI.

Figure 7:
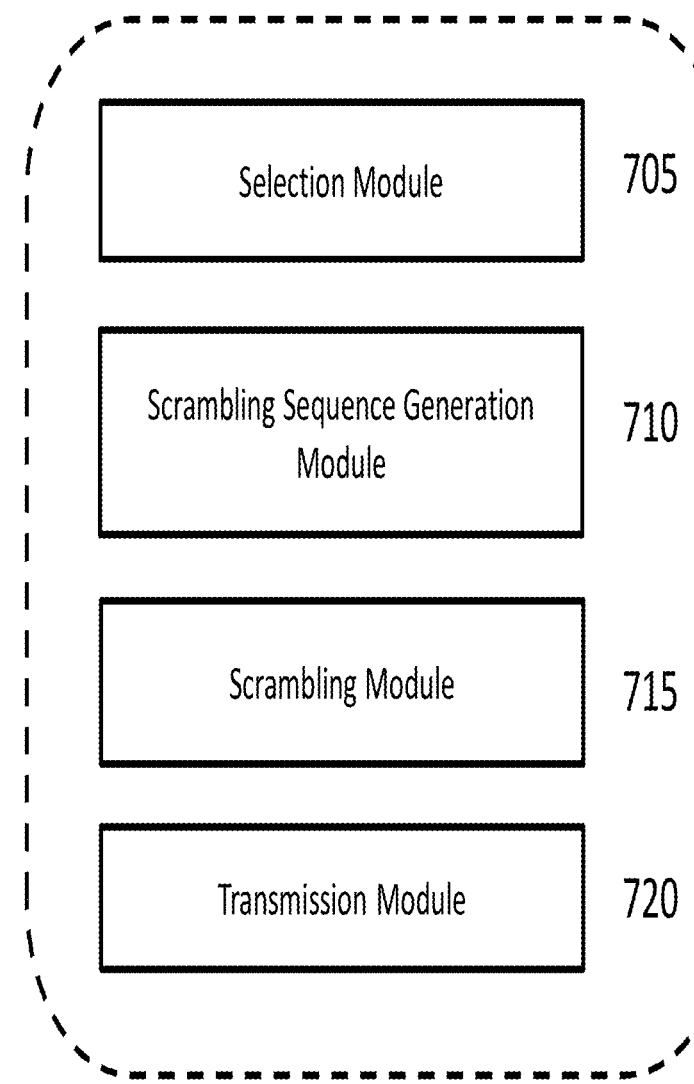
FIG. 7 illustrates a radio access node according to an example embodiment.

FIG. 7 illustrates a radio access node 700 according to an example embodiment. Radio access node 700 may be used to perform a method such as that illustrated in FIG. 4, for instance, and it may further comprise additional modules configured to perform any or all of the operations described in relation to FIG. 4, for instance. The term "module", as used in conjunction with this and other embodiments, denotes any suitable combination of hardware and/or software capable of performing the designated functions. For example, one or modules may be implemented by a combination of one or more processors and memory.

Referring to FIG. 7, radio access node 700 comprises a selection module 705, a scrambling sequence generation module 710, a scrambling module 715, and a transmission module 720. Selection module 705 is configured to select an initialization value for a scrambling sequence to be applied to a message based on whether the message is intended for a non-standard device, wherein the initialization value is selected from among at least a first value corresponding to a standard device type and a second value corresponding to a non-standard device type. Scrambling sequence generation module 710 is configured to generate the scrambling sequence using the initialization value. Scrambling module 715 is configured to scramble the message using the scrambling sequence. Transmission module 720 is configured to transmit the message.

Figure 8:
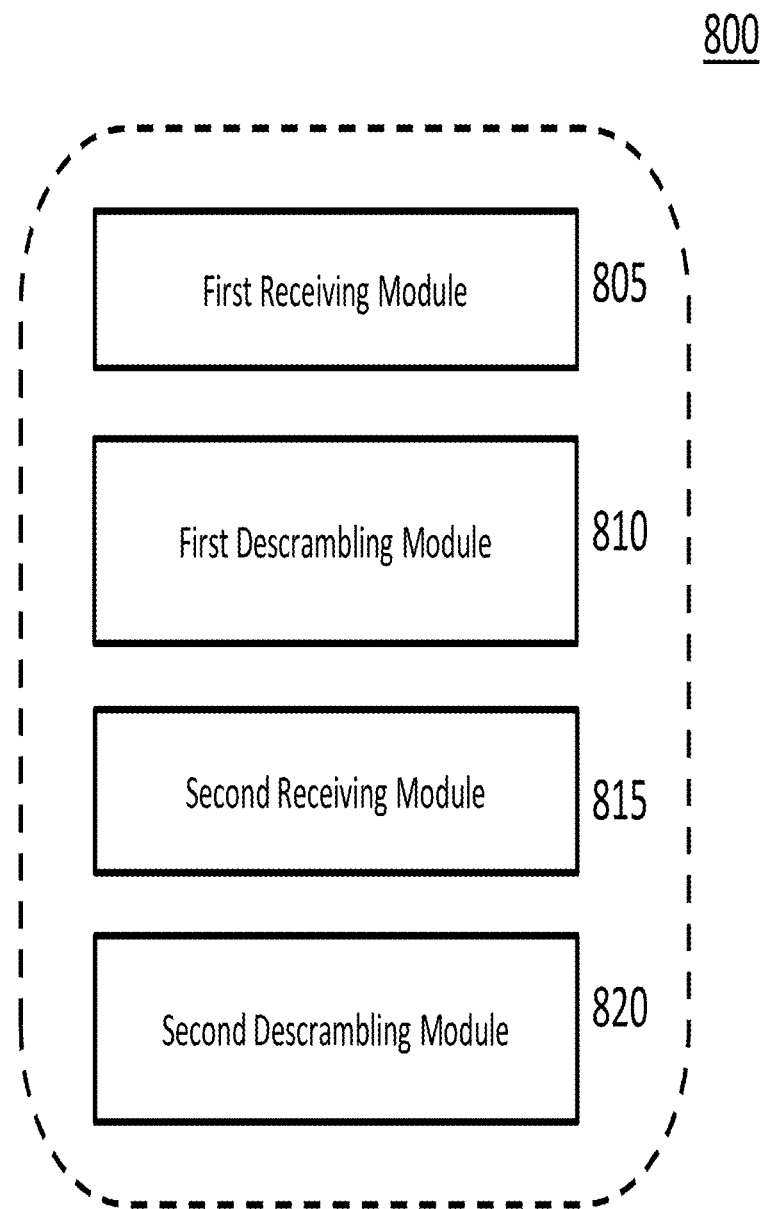
FIG. 8 illustrates a UE according to an example embodiment.

FIG. 8 illustrates a wireless communication device 800 according to an example embodiment. Wireless communication device 800 may be used to perform a method such as that illustrated in FIG. 5, for instance, and it may further comprise additional modules configured to perform any or all of the operations described in relation to FIG. 5, for instance.

Referring to FIG. 8, wireless communication device 800 comprises a first receiving module 805, a first descrambling module 810, a second receiving module 815, and a second descrambling module 820. First receiving module 805 is configured to receive a first message via a first communication channel, wherein the first message is scrambled, at least in part, according to an RNTI associated with a standard UE class, and the first message comprises control information specifying a format of a second message. First descrambling module 810 is configured to descramble the first message according to the first scrambling sequence. Second receiving module 815 is configured to receive the second message via a second communication channel, wherein the second message is scrambled according to a second scrambling sequence generated with an initialization value defined independent of the RNTI, and the second message comprises data. Second descrambling module 820 is configured to descramble the second message according to the second scrambling sequence.

Figure 9:
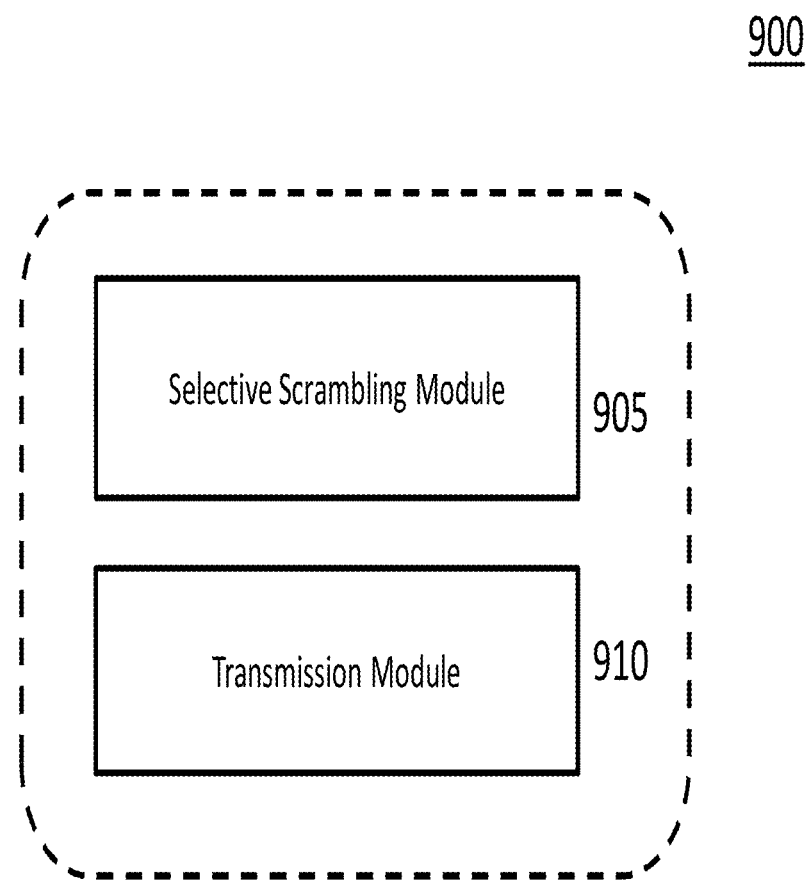
FIG. 9 illustrates a radio access node according to another example embodiment.

FIG. 9 illustrates a radio access node 900 according to an example embodiment. Radio access node 900 may be used to perform a method such as that illustrated in FIG. 6, for instance, and it may further comprise additional modules configured to perform any or all of the operations described in relation to FIG. 6, for instance.

Referring to FIG. 9, radio access node 900 comprises a selective scrambling module 905 and a transmission module 910. Selective scrambling module 905 is configured to selectively scramble a message using a first scrambling sequence or a second scrambling sequence based on whether the message is intended for a non-standard device, wherein the first scrambling sequence is generated with a first initialization value corresponding to a first UE class, and the second scrambling sequence is generated with a second initialization value corresponding to a second UE class. Transmission module 910 is configured to transmit the message.

In the above-description, it is to be understood that the terminology used herein is for the purpose of describing particular embodiments only and is not intended to be limiting of the disclosed subject matter in general. Unless otherwise defined, all terms (including technical and scientific terms) used herein have the same meaning as commonly understood by those of ordinary skill in the art. Terms such as those defined in commonly used dictionaries should be interpreted as having a meaning consistent with their meaning in the context of this specification and the relevant art and will not be interpreted in an idealized or overly formal sense unless expressly indicated to the contrary.

Where a feature is described as being "connected", "responsive", or variants thereof to another feature, it can be directly connected or responsive to the other element or intervening elements may be present. Furthermore, "coupled", "connected", "responsive", or variants thereof as used herein may include wirelessly connected or responsive. As used herein, the singular forms "a", "an" and "the" are intended to include the plural forms as well, unless the context clearly indicates otherwise. Well-known functions or constructions may not be described in detail for the sake of brevity and/or clarity. The term "and/or" includes any and all combinations of one or more of the associated listed items.

Although the terms first, second, third, etc. may be used herein to describe various features, these features should not be limited by these terms. Rather, these terms are used merely to distinguish one feature from another. Thus a first feature could alternatively be termed a second feature and vice-versa without departing from the presented teachings.

As used herein, terms such as "comprise", "comprising", "comprises", "include", "including", "includes", "have", "has", "having", etc., are open-ended, and include one or more stated features but does not preclude the presence or addition of other features.

Certain embodiments are described herein with reference to block diagrams and/or flowchart illustrations of computer-implemented methods, apparatus (systems and/or devices) and/or computer program products. A block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, certain embodiments may be implemented in hardware and/or in software (including firmware, resident software, micro-code, etc.) that runs on a processor such as a digital signal processor, which may collectively be referred to as "circuitry," "a module" or variants thereof.

In some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the disclosed subject matter. Moreover, although some of the diagrams include arrows on communication paths to show a primary direction of communication, it is to be understood that communication may occur in the opposite direction to the depicted arrows.

While the disclosed subject matter has been presented above with reference to various embodiments, it will be understood that various changes in form and details may be made to the described embodiments without departing from the overall scope of the disclosed subject matter.

The invention claimed is:

1. A method of operating a wireless communication device belonging to a non-standard user equipment (UE) class, comprising:
   receiving a first message via a first communication channel, wherein the first message is scrambled, at least in part, according to a radio network temporary identifier (RNTI) associated with a standard UE class, and the first message comprises control information specifying a format of a second message;
   descrambling the first message according to the first scrambling sequence;
   receiving the second message via a second communication channel, wherein the second message is scrambled according to a second scrambling sequence generated with an initialization value $c_{init}$ defined according to the equation $c_{init} = X \cdot 2^{14} + q \cdot 2^{13} + \lfloor n_s/2 \rfloor \cdot 2^9 + N_{ID}^{cell}$, where q denotes a codeword, $n_s$ denotes a slot number within a radio frame, $N_{ID}^{cell}$ denotes a physical layer cell identity of the radio access node, and X denotes a value that is different from a value of the RNTI, and wherein the second message comprises data; and
   descrambling the second message according to the second scrambling sequence.

2. The method of claim 1, further comprising determining that the second message is intended for the wireless communication device, based on a determination that the wireless communication device is capable of descrambling the second message according to the second scrambling sequence.

3. The method of claim 1, further comprising:
receiving a third message via the second communication channel, wherein the third message is scrambled according to a third scrambling sequence generated with an initialization value defined according to the RNTI, and the third message comprises data; and
attempting to descramble the third message according to the second scrambling sequence.

4. The method of claim 1, wherein the first message comprises a cyclic redundancy check that is scrambled according to the RNTI and a codeword that is scrambled independent of the RNTI.

5. The method of claim 1, wherein the first channel is a physical downlink control channel (PDCCH) and the second channel is a physical downlink shared channel (PDSCH).

6. The method of claim 1, wherein X is defined independent of the RNTI.

7. A wireless communication device belonging to a non-standard user equipment (UE) class, comprising:
one or more processors configured to:
receive a first message via a first communication channel, wherein the first message is scrambled, at least in part, according to a radio network temporary identifier (RNTI) associated with a standard UE class, and the first message comprises control information specifying a format of a second message;
descramble the first message according to the first scrambling sequence;
receive the second message via a second communication channel, wherein the second message is scrambled according to a second scrambling sequence generated with an initialization value $c_{init}$ defined according to the equation $c_{init}=X \cdot 2^{14}+q \cdot 2^{13} \lfloor n_s/2 \rfloor \cdot 2_9+N_{ID}^{cell}$, where q denotes a codeword, $n_s$ denotes a slot number within a radio frame, $N_{ID}^{cell}$ denotes a physical layer cell identity of the radio access node, and X denotes a value that is different from a value of the RNTI, and wherein the second message comprises data; and
descramble the second message according to the second scrambling sequence.

8. The wireless communication device of claim 7, wherein the one or more processors are further configured to determine that the second message is intended for the wireless communication device, based on a determination that the wireless communication device is capable of descrambling the second message according to the second scrambling sequence.

9. The wireless communication device of claim 7, wherein the first message comprises a cyclic redundancy check that is scrambled by the RNTI and a codeword that is scrambled independent of the RNTI.

10. The wireless communication device of claim 7, wherein the first channel is a physical downlink control channel (PDCCH) and the second channel is a physical downlink shared channel (PDSCH).

11. The wireless communication device of claim 7, wherein X is defined independent of RNTI.

* * * * *